United States Patent [19]

Krieg et al.

[11] Patent Number: 5,700,894
[45] Date of Patent: Dec. 23, 1997

US005700894A

[54] TRANSPARENT PLASTIC PANE CONTAINING A COPOLYMER OF METHYLMETHACRYLATE AND POLYFUNCTIONAL ACRYLATES

[75] Inventors: Manfred Krieg, Darmstadt; Christa Weber, Gross-Umstadt; Peter Szigeti, Buettelborn, all of Germany

[73] Assignee: Roehm GmbH Chemische Fabrik, Darmstadt, Germany

[21] Appl. No.: 568,385

[22] Filed: Dec. 6, 1995

[30] Foreign Application Priority Data

Dec. 6, 1994 [DE] Germany .................. 44 43 355.7

[51] Int. Cl.⁶ .................. C08F 20/18; C08F 20/20; C08L 33/12
[52] U.S. Cl. .................. 526/323.2; 526/323.1; 526/329.7; 524/560; 524/561; 264/290.2
[58] Field of Search .................. 526/329.7, 323.1, 526/323.2; 264/290.2; 524/559, 560

[56] References Cited

U.S. PATENT DOCUMENTS

| | | | |
|---|---|---|---|
| 3,966,693 | 6/1976 | Kato | 526/329.7 |
| 4,550,136 | 10/1985 | Hosch | 524/718 |
| 4,622,377 | 11/1986 | Moncur | 526/323.2 |
| 4,859,750 | 8/1989 | Kato et al. | 526/329.7 |

FOREIGN PATENT DOCUMENTS

| | | |
|---|---|---|
| 0138301 | 6/1988 | Japan . |
| 1156424 | 6/1969 | United Kingdom . |
| 2 277 521 | 11/1994 | United Kingdom . |

*Primary Examiner*—Tae Yoon
*Attorney, Agent, or Firm*—Oblon, Spivak, McClelland, Maier & Neustadt, P.C.

[57] ABSTRACT

A transparent plastic pane for an aircraft canopy consisting essentially of a copolymer of methylmethacrylate and polyfunctional acrylates, wherein the content of methylmethacrylate is greater than about 95 wt. % and the content of polyfunctional acrylates is 0.5 to 5% of the copolymer, and which is obtained by cast polymerization, whereby the temperature for final polymerization is maintained at 110° C. to 130° C. for at least 5 hours.

23 Claims, No Drawings

TRANSPARENT PLASTIC PANE CONTAINING A COPOLYMER OF METHYLMETHACRYLATE AND POLYFUNCTIONAL ACRYLATES

BACKGROUND OF THE INVENTION

1. Field of the Invention

The present invention relates to plastic panes based on polymethylmethacrylate, which can he used as a canopy material for aircraft and which are able to tolerate high mechanical, physical, and chemical stresses.

2. Description of the Background

Aircraft canopies are subjected to an unusually wide array of high mechanical, physical and chemical stresses. For example, the intensity of short-wave light at high altitudes is much more intensive than at ground level. Also, aircraft canopies are subjected to high temperatures, as well as high temperature differences. There are even extraordinary chemical stresses on aircraft during cleaning procedures. All of these factors necessitate that such canopies be made of special materials.

Consequently, the aircraft industry has specified a number of requirements for the use of plastic panes as a canopy material. One basic requirement of the aircraft canopy is high transparency and colorlessness, as well as good stability against yellowing.

Another requirement relates to the heat deflection temperature of the material. The related specification (Military P-25690 A) requires that if biaxially stretched glass panes are thermally stressed at 110° C. over a period of 24 hours, the shrinkage (thermal relaxation) must not exceed 10%.

Also important is high resistance to stress corrosion. A standard also exists for this: Military P-25690 B or LN 65321.

Of course, there are practical considerations as well. For example, a good aircraft canopy material should, for example, be able to withstand at least 5,000 flying hours.

Unfortunately, it is very difficult to meet all of these requirements at the same time. Frequently, an improvement in one property will result in a worsening of another. In most cases, the literature, in particular the patent literature, only describes the improvement of a single property at a time.

EP 012427381 describes, for example, an aircraft canopy material made of a methylmethacrylate-styrene-maleic anhydride copolymer having improved thermal relaxation which has a content of 93 to 95% of the initially mentioned monomer and a content of 5 to 7% of the two last mentioned monomers.

The material furthermore contains a crosslinking monomer, preferably 0.5% of allyl methacrylate, as well as small amounts of UV absorber. Due to the styrene content it must, however, be expected that the probability of yellowing is increased.

U.S. Pat. No. 4,622,377 describes and claims 0.4 to 2.5 mol % neopentylene glycol-dimethacrylate as a crosslinking agent in aircraft panes, preferably on a polymethylmethacrylate (PMMA) basis, in order to improve the resistance to chemical stresses due to sulfuric acid droplets. Improvements in the other properties of this material, such as UV stability or thermal stability, are not considered.

Japanese patent JP 03 47,856 describes photoresistant PMMA-based panes. Both a benzotriazole-based UV absorber and a UV stabilizer based on a stearically hindered amine are used.

The advantage here is also mostly in the good UV stability of the material.

Pure stretched PMMA only reaches Vicat values of 110° C. to 115° C., and is not able to meet the above-mentioned required specification. It is, therefore, necessary to introduce comonomers whose addition results in an increased Vicat value. Methacrylamide, methacrylic acid, isobornyl methacrylate, or styrene and maleic anhydride have been disclosed, as well as a number of polyethylene-unsaturated (crosslinking) monomers, such as, for example, allyl methacrylate, ethylene glycol dimethacrylate, tetraethylene glycol dimethacrylate. Not all monomers are equally well suited, however, during cast polymerization they may, for example, cause production problems due to gelling that occurs too rapidly, as in the case of several dimethacrylates, or may lead to yellowing and particle formation, as in the case of methacrylamide, or they are toxic.

Although crosslinking monomers having an acrylate basis have been described (for example, see page 3, lines 59–65 in EPA 0 124 273), no special effect has been associated with them.

The requirements for an aircraft canopy material also include good stability with respect to UV radiation. It is, therefore, always equipped with UV absorbers. Agents of choice are UV absorbers based upon benzotriazole derivatives, such as, for example, Tinuvin P®, distributed by Ciba-Geigy. It is described, for example, in EPA 0 124 273. UV absorbers are also called UV stabilizers in the literature. By absorbing ultraviolet rays, they act as an optical filter, i.e., a purely physical action.

The addition to stearically hindered amines to an aircraft canopy material has an entirely different effect, i.e., a chemical one. The former scavenge free radicals which form in the presence of a radiation load and which would otherwise slowly destroy the glass material. Such additions have been described in Japanese patent JP 03 47,856 and are called "hindered amine light stabilizers," abbreviated as "HALS."

An important production aid in the production of cast polymers is a suitable mold release agent which is supposed to facilitate the release of the molded part from its mold. EPA 97 948 mentions, for example, dioctylsulfosuccinate.

Thus, a need exists for an aircraft canopy material which meets all requirements, i.e., has good transparency, resistance to light, heat deflection temperature, and chemical resistance.

SUMMARY OF THE INVENTION

Accordingly, it is an object of the present invention to provide a transparent plastic pane for an aircraft canopy which has, at once, good transparency, resistance to light, heat deflection temperature and chemical resistance.

The above objects and offers are provided by a transparent plastic pane for an aircraft canopy consisting essentially of a copolymer of methylmethacrylate and polyfunctional acrylates, wherein the content of methylmethacrylate is greater than about 95 wt. % and the content of polyfunctional acrylates is about 0.5 to 5% of the copolymer, and which is obtained by cast polymerization, whereby the temperature of final polymerization is maintained at about 110° C. to 130° C. for at least about 5 hours.

DETAILED DESCRIPTION OF THE PREFERRED EMBODIMENTS

The present invention is, in part, predicated upon the discovery that it is not enough to merely combine the parameters mentioned in the literature, each of which is responsible for improving a single property, in order to obtain a panoply of improved properties. In fact, all too often an improvement in one property results, at the same time, in a diminution of another. Mass ratios are also critical. Only specific amounts of additives within narrow limits provide good results.

Moreover, the present invention is, in part, also predicated upon the discovery that changes in the process parameters of the cast polymerization are essential to the improvement of application properties.

The present invention provides a transparent plastic pane for an aircraft canopy consisting essentially of a copolymer of methylmethacrylate and polyfunctional acrylates, wherein the content of methylmethacrylate is greater than about 95 wt. %, and the content of polyfunctional acrylates is about 0.5 to 5% of the copolymer, and that is obtained by cast polymerization, whereby the temperature for final polymerization is maintained at about 110° C. to 130° C. for at least about 5 hours.

The main component of the present copolymer for aircraft canopies is methylmethacrylate. Its content in the final product is at least 95 wt. %. It is preferred, however, that its content be about 96 to 98%. Polymethylmethacrylate as a material, by itself, does not yellow.

To assure good thermal relaxation values or high Vicat values, crosslinking monomers are also used. In accordance with the present invention, it has unexpectedly been found that polyfunctional acrylates yield a surprisingly good combination of application properties. In particular, they afford the lowest drop in Vicat value after biaxial stretching. They also improve resistance to stress corrosion. Such a result can clearly not be taken for granted when using other crosslinkers. For example, allyl methacrylate, frequently used, brings about good resistance to stress corrosion and also results in high Vicat values prior to stretching. However, after stretching and the related thermal stress, the Vicat values are 5° to 10° C. lower. A compensation by means of increasing the crosslinker content does not result in any improvement, however, unless greater than about 10% are used. The same is true for frequently used ethylene glycol dimethacrylate.

Acrylate crosslinkers which may be used according to the present invention are bi-, tri-, or tetrafunctional in relation to the acrylate function. Bifunctional acrylates are, for example, ethylene glycol diacrylate, 1,3-butanediol diacrylate, 1,4-butanediol diacrylate, 1,6-hexanediol diacrylate, polyethylene glycol-diacrylate. An example of a trifunctional acrylate is trimethylol propane triacrylate. Pentaerythrite tetraacrylate is an example for a tetrafunctional acrylate. The amount of polyfunctional acrylate used is generally about 0.5 to 5%, preferably about 1 to 3%.

The product according to the present invention generally contains a UV absorber which prevents a deeper penetration of UV light through absorption, and/or a free radical scavenger which neutralizes the destructive action of free radicals generated by radiation loading.

Effective UV absorbers which may be used are, for example, anthraquinone and benzophenone derivatives, such as 2-hydroxy-4-methoxybenzophenone, or preferably compounds based on benzotriazole, such as 2-(2'-hydroxy-5'-methylphenyl)benzotriazole.

The product according to the present invention contains sterically hindered amines (HALS), such as, for example, 2,2,6,6-tetramethyl-4-piperidyl sebacate, as UV stabilizers which act as free radical scavengers. The addition amounts according to the present invention generally range from about 0.005 to 0.5%, preferably 0.03 to 0.2%, both for the UV absorber and the UV stabilizer. Generally, the present polymer contains both of them.

The product according to the present invention also preferably contains an effective mold release agent based on sulfosuccinate, for example, sodium diisooctyl sulfosuccinate. Such a mold release agent is effective in very small doses from about 0.001% to 0.1%, which is advantageous as higher doses might cause a softening effect on the polymer matrix.

In addition, other monomers may be added for specific functions, for example, for good adhesion of the molded part to its mold during and after polymerization. Good adhesive results may be obtained by using hydroxyesters of (meth) acrylic acid, such as, for example, 2-hydroxyethyl-(meth) acrylate or 2-hydroxypropyl-(meth)-acrylate, as well as monomers with an amine function, such as, for example, dimethylaminoethyl-(meth)acrylate. The addition amounts generally range from about 0.1 to 1%.

The material may also be colored or only slightly tinted, however, transparency is necessary. In the interest of obtaining good optical transparency properties, the surfaces should be disposed parallel to each other and should be smooth and even.

Further, in order to obtain a product which is useful for all application requirements, a thermal treatment is required according to the present invention. This entails employment of a final polymerization which is started when approximately 90% of the used monomers have been polymerized. For this purpose, the cast material is heated slowly from the polymerization temperature (in most cases about 40° C.) to about 110° C. to 130° C. , preferably to about 115° C. to 120° C., and this temperature level is maintained for at least about 5 hours. A final polymerization of less than 5 hours results in distinctly poorer results, especially at temperatures from 100° C. to 115° C. Generally, final polymerization is performed for more than about 7 hours, preferably about 10 hours or longer. In most case, no further improvement can be obtained by exceeding 20 hours of final thermal treatment. The effect of this thermal treatment can, perhaps, be attributed to a changed state of order of the macromolecules. The results achieved cannot be fully explained merely by a reduction of the residual monomer content together with a substantial destruction of the residual initiator.

The last step entails biaxial stretching. For this purpose, the material is pretempered as known, for example, at about 140° C. to 160° C. for about 1 to 2 hours and is then biaxially stretched by pulling or pressing to a thickness of approximately 20–40%. The degree of stretching is thus approximately 60–80%.

The transparent material of the present invention is characterized by having a low residual monomer content, such as less than about 0.5%, and preferably less than about 0.3%.

Preferably, the plastic pane of the present invention has a residual monomer content of $\leq 0.5\%$, preferably <0.3%. Also, it is preferred if the present plastic pane has a softening temperature, measured according to Vicat, of at least 120° C. prior to biaxial stretching or, respectively, at least 117° C. after biaxial stretching. Furthermore, it is preferred if the present plastic pane has a stress corrosion value of at least about 18 N/mm$^2$.

A further description of the present invention will be by way of an Example, which is provided solely for purposes of illustration and which is not intended to be limitative.

EXAMPLE

Production of PMMA Pane According to the Present Invention

A monomer mixture containing 97.75 wt. % methylmethacrylate, 2 wt. % trimethylol propane triacrylate, 0.05 wt. % 2-(2'-hydroxy-5'-methylphenyl)benzotriazole, 0.05 wt. % bis-2,2,6,6-tetramethyl-4-piperidyl sebacate, 0.1 wt. % 2,2'-azo-bis-isobutyronitrile, 0.05 wt. % tert-butylperbenzoate was filled into a 6 mm thick flat chamber formed by two glass panes and a sealing band encircling them along the edge and was brought to polymerization in a 40° C. water bath. To complete polymerization, the flat chamber was then heated slowly from 40° C. to 115° C. and was maintained at this temperature for 10 hours. The pane was then exposed for 1 hour to a temperature of 150° C. This treatment corresponds in its thermal conditions and these are essential, to a stretching process.

| Properties of the finished pane: | |
| --- | --- |
| Vicat value as received: | 121° C. |
| Vicat value after a thermal treatment 1 h, 150° C. | 119° C. |
| Residual monomer content: | 0.20% |
| Stress corrosion according to LN 65321: | 20.3 N/mm$^2$ |

Generally, and unless otherwise specified, the % amounts recited in the present specification are based upon the total weight of the copolymer composition.

Having described the present invention, it will now be apparent to one of ordinary skill in the art that many changes and modifications may be made to the above-described embodiments without departing from the spirit and the scope of the present invention.

What is claimed as new and is desired to be secured by Letters Patent of the United States is:

1. A transparent plastic pane for an aircraft canopy having a residual monomer content of ≦0.5%, a stress corrosion value of at least 18 N/mm$^2$, a softening temperature, according to Vicat, of at least 120° C. prior to biaxial stretching or at least 117° C. after biaxial stretching, consisting essentially of a copolymer of methylmethacrylate and polyfunctional acrylates, wherein the content of methylmethacrylate is greater than about 95 wt. % and a content of polyfunctional acrylates is about 0.5 to 5% of the copolymer, which is obtained by a process, which comprises:
   a) conducting a first cast polymerization by heating monomer reactants from a temperature of about 40° C. to about 110° C. to 130° C. until about 90% of the monomers used are polymerized, and
   b) conducting a final polymerization for at least about 5 hours at a temperature of about 110° C. to 130° C.

2. The plastic pane of claim 1, which is biaxially stretched.

3. The plastic pane of claim 1, which contains about 0.005 to 0.5% of a UV stabilizer based on a sterically hindered amine (HALS).

4. The plastic pane of claim 1, which contains about 0.005 to 0.5% of a UV absorber.

5. The plastic pane of claim 1, which contains 0.001 to 0.1% of a mold release agent.

6. The plastic pane of claim 1, wherein the polyfunctional acrylate is trimethylol propane triacrylate, hexanediol diacrylate or a mixture thereof.

7. The plastic pane of claim 1, wherein the copolymer further contains about 0.01 to 1% of polymerizable units of another monomer.

8. The plastic pane of claim 7, wherein said another monomer is selected from the group consisting of esters and amides of acrylic acid and methacrylic acid.

9. The plastic pane of claim 7, wherein the other monomer is a polyfunctional methacrylate, hydroxyfunctional (meth)acrylate or a mixture thereof.

10. The plastic pane of claim 1, said copolymer has a content of from about 96 to 98% methymethacrylate.

11. The plastic pane of claim 1, wherein for said final polymerization, the monomer reactants are heated from about 115° C. to 120° C. for more than about 7 hours.

12. The plastic pane of claim 11, wherein said monomer reactants are heated for more than about 10 hours.

13. The plastic pane of claim 1, which has a residual monomer content of <0.3%.

14. The plastic pane of claim 1, wherein said process of preparing the same further comprises, after step b);
   c) pre-tempering said plastic material at about 140° C. to 160° C. for about 1 to 2 hours; and
   d) biaxially stretching said plastic material with a degree of stretching of about 60–80%.

15. A process for preparing a transparent plastic pane for an aircraft canopy having a residual monomer content of ≦0.5%, a stress corrosion value of at least 18 N/mm$^2$, a softening temperature, according to Vicat, of at least 120° C. prior to biaxial stretching or at least 117° C. after biaxial stretching, consisting essentially of a copolymer of methylmethacrylate and polyfunctional acrylates, wherein the content of methylmethacrylate is greater than about 95 wt % and a content of polyfunctional acrylates is about 0.5 to 5% of the copolymer, the process comprising:
   a) conducting a first cast polymerization by heating monomer reactants from a temperature of about 40° C. to about 110° C. to 130° C. until about 90% of the monomers used are polymerized, and
   b) conducting a final polymerization for at least about 5 hours at a temperature of about 110° C. to 130° C.

16. The process of claim 15, wherein the period of step b) is at least about 7 hours.

17. The process of claim 15, wherein the period of step b) is at least about 10 hours.

18. The process of claim 15, which further comprises, after step b), pre-tempering and biaxial stretching said plastic material.

19. The process of claim 18, which comprises, after step b)
   c) pre-tempering said plastic material at about 140° to 160° C. for about 1 to 2 hours; and
   d) biaxially stretching said plastic material with a degree of stretching of about 60–80%.

20. The process of claim 19, wherein after step d), said plastic material has a thickness of about 20–40% of that after step b).

21. The process of claim 15, wherein for said final polymerization, the monomer reactants are heated from about 115° C. to 120° C. for more than about 7 hours.

22. The process of claim 21, wherein said monomer reactants are heated for more than about 10 hours.

23. The process of claim 15, which produces a product having a residual monomer content of <0.3%.

* * * * *